United States Patent
Ikai et al.

(10) Patent No.: US 10,027,272 B2
(45) Date of Patent: **\*Jul. 17, 2018**

(54) MOTOR CONTROL DEVICE INCLUDING TORQUE COMMAND LIMIT UNIT

(71) Applicant: FANUC CORPORATION, Yamanashi (JP)

(72) Inventors: Satoshi Ikai, Yamanashi (JP); Yuuki Kumamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/443,116

(22) Filed: Feb. 27, 2017

(65) Prior Publication Data

US 2017/0250643 A1  Aug. 31, 2017

(30) Foreign Application Priority Data

Feb. 29, 2016 (JP) ................ 2016-037465

(51) Int. Cl.
| | |
|---|---|
| *H02P 6/08* | (2016.01) |
| *H02P 29/024* | (2016.01) |
| *B23Q 5/58* | (2006.01) |
| *H02P 27/08* | (2006.01) |
| *H02P 29/032* | (2016.01) |

(52) U.S. Cl.
CPC ............ *H02P 29/025* (2013.01); *B23Q 5/58* (2013.01); *H02P 6/08* (2013.01); *H02P 27/08* (2013.01); *H02P 29/032* (2016.02)

(58) Field of Classification Search
CPC ........ H02P 29/025; H02P 29/032; H02P 6/08; H02P 27/08; B23Q 5/58
USPC ........................................................ 318/449
See application file for complete search history.

(56) References Cited

U.S. PATENT DOCUMENTS 4,095,154 A * 6/1978 Williamson ............ H02P 3/06
                                                  318/376
6,362,585 B1 * 3/2002 Hiti ................... B60L 11/1803
                                                  318/430

(Continued)

FOREIGN PATENT DOCUMENTS

| JP | 2007129801 A | 5/2007 |
|---|---|---|
| JP | 2007135311 A | 5/2007 |

(Continued)

*Primary Examiner* — Kawing Chan
(74) *Attorney, Agent, or Firm* — RatnerPrestia (57) ABSTRACT

A motor control device which controls a motor in a machine tool or an industrial machine includes: a power outage detection unit that detects a power outage of a power source which supplies electric power for driving the motor; a DC link voltage detection unit that detects a value of a DC link voltage applied to an amplifier which drives the motor; a comparison unit which compares the value of the DC link voltage with a predetermined threshold value; a torque command generation unit which generates a torque command for driving the motor; a torque limit value setting unit which sets a torque limit value in accordance with a result of a comparison by the comparison unit; and a torque command limit unit which limits the torque command to the torque limit value when a power outage is detected by the power outage detection unit.

6 Claims, 4 Drawing Sheets

(56) References Cited

U.S. PATENT DOCUMENTS

| | | | |
|---|---|---|---|
| 7,880,345 B2* | 2/2011 | Hoffmann | H02K 7/06 310/12.13 |
| 8,054,015 B2* | 11/2011 | Iwashita | H02P 3/18 318/372 |
| 8,803,458 B2* | 8/2014 | Horikoshi | H02P 3/22 318/400.01 |
| 9,092,027 B2* | 7/2015 | Okita | G05B 19/4062 |
| 9,248,539 B2* | 2/2016 | Tajima | H02P 6/00 |
| 9,515,581 B2* | 12/2016 | Ogawa | H02P 3/22 |
| 2003/0102833 A1* | 6/2003 | Murakami | H02P 6/24 318/362 |
| 2004/0160208 A1* | 8/2004 | Youm | H02P 3/22 318/801 |
| 2005/0077853 A1* | 4/2005 | Nagakura | H02M 7/48 318/432 |
| 2011/0068728 A1* | 3/2011 | Kuratani | H02M 1/32 318/490 |
| 2012/0323430 A1* | 12/2012 | Nakamura | B60L 11/1803 701/22 |
| 2013/0015790 A1* | 1/2013 | Kermarrec | H02P 29/025 318/364 |
| 2014/0001992 A1* | 1/2014 | Yang | H02P 27/085 318/400.25 |
| 2014/0118126 A1* | 5/2014 | Garg | G06F 3/016 340/407.1 |
| 2014/0125264 A1* | 5/2014 | Nakamura | H02P 6/10 318/400.23 |
| 2014/0277983 A1* | 9/2014 | Bayar | B60L 7/18 701/71 |
| 2015/0372623 A1* | 12/2015 | Pramod | H02P 6/08 318/400.02 |
| 2016/0028331 A1* | 1/2016 | Hashimoto | H02P 29/025 318/479 |
| 2017/0250644 A1* | 8/2017 | Ikai | B23Q 5/58 |

FOREIGN PATENT DOCUMENTS

| | | |
|---|---|---|
| JP | 5612058 B | 10/2014 |
| JP | 5746276 B | 7/2015 |
| JP | 2015154566 A | 8/2015 |
| JP | 2016-25828 A | 2/2016 |

* cited by examiner

MOTOR CONTROL DEVICE INCLUDING TORQUE COMMAND LIMIT UNIT

BACKGROUND OF THE INVENTION

1. Field of the Invention

The present invention relates to a motor control device, and more particularly, to a motor control device which decelerates a motor by limiting the torque of the motor at the time of a power failure of a power source.

2. Description of the Related Art

In a motor control device which controls a motor in a machine tool or an industrial machine, alternating current power at an alternating current power source side is converted to direct current power to output the direct current power to a DC link, and then the direct current power is further converted by an amplifier to alternating current power, which is supplied as drive power of the motor.

When a power source which supplies electric power for driving the motor has been stopped, it is preferable to stop the motor which drives a feed axis and the like in a machine tool as soon as possible.

For example, as disclosed in Japanese Patent No. 5612058, in a machine tool including a feed axis motor which drives a feed axis and a main axis motor which drives a main axis, there is known a method of avoiding an overvoltage alarm or a low voltage alarm by accelerating or decelerating the main axis motor in accordance with a value of a DC link voltage when a power failure occurs at an alternating current power source side.

Further for example, as disclosed in Japanese Patent No. 5746276, in a machine tool including a feed axis motor which drives a feed axis and a main axis motor which drives a main axis, there is known a method capable of securely stopping the feed axis motor at an early stage by performing command to output an excitation current larger than an excitation current commanded by a master control means to the main axis motor if an operation of the feed axis motor satisfies a predetermined determination condition even when a power failure occurs at an alternating current power source side, and of restraining heat generation of the main axis motor at the time of a normal operation.

Still further, for example, from Japanese Unexamined Patent Publication (Kokai) No. 2016-25828, there is known a motor control device that quickly stops a motor which drives a feed axis, while avoiding an overvoltage alarm after a power failure.

As methods of decelerating the motor, there are a method of generating a deceleration torque in the motor (hereinafter referred to as "deceleration by control"), and a method of applying a dynamic brake by connecting a resistance to the motor and allowing a current to flow therethrough, thereby allowing energy to be consumed (hereinafter referred to as "deceleration by hardware"). When a power failure occurs, power supply from the power source to the motor is interrupted, and thus the "deceleration by control" is performed using electric power as accumulated in the DC link. Since in general, a distance until the motor stops (braking distance) by the "deceleration by control" is shorter than that by the "deceleration by hardware", to stop the motor because of a power failure as soon as possible, securing a long time for the "deceleration by control" within limited electric power is preferable.

Usually, in decelerating the motor, due to a regenerative operation, motive energy decreases and electric power (electric energy) increases, in stopping the motor when a power failure occurs as soon as possible, a time of the "deceleration by control" can be secured to be long within limited electric power.

Figure 5:
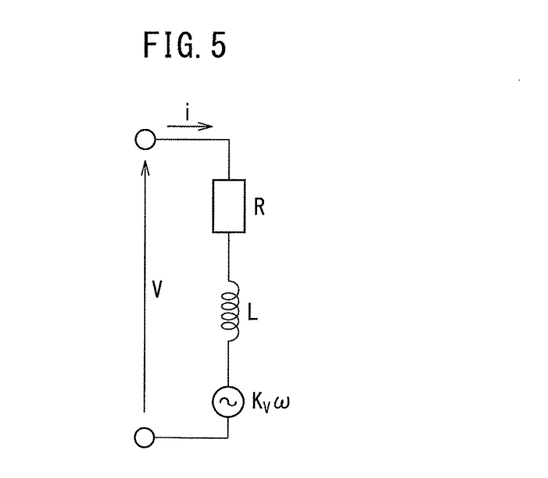
FIG. 5 is a circuit diagram illustrating an equivalent circuit of the motor per phase.
Figure 6:
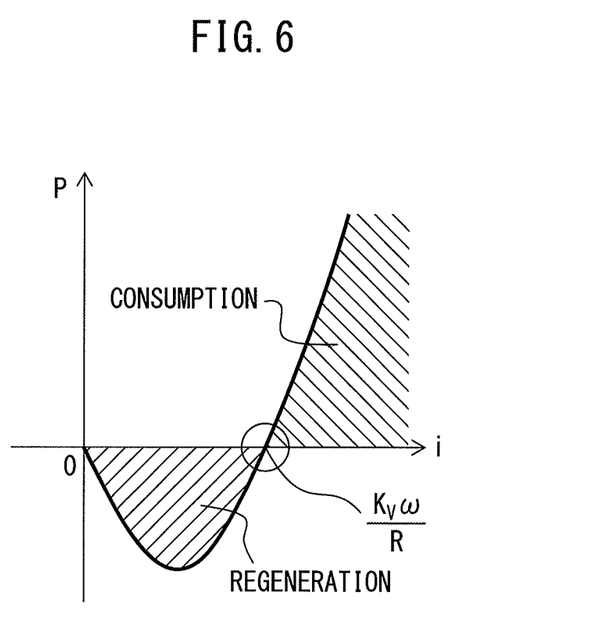
FIG. 6 is a diagram illustrating a relationship between a winding current of the motor and electric power.

However, depending on specifications of the motor, there occurs a situation in which when the deceleration torque is allowed to be too large in the "deceleration by control", instead of the regeneration, powering that consumes electric power is performed, which consumes limited electric power. FIG. 5 is a circuit diagram illustrating an equivalent circuit of the motor per phase. Further, FIG. 6 is a diagram illustrating a relationship between a winding current of the motor and electric power. Assuming that the winding current of the motor is i [A], a terminal voltage of the motor is V [V], an angular velocity of the motor is ω (t) [rad/sec], a winding resistance of the motor per phase is R [Ω], an inductance per phase is L [H], and a counter electromotive force coefficient of the motor is Kv [V×sec/rad], an electric power P [W] of the motor is represented by expression 1.

$$P = Vi \qquad (1)$$
$$= Ri^2 + Li\frac{di}{dt} - K_V \omega(t)i$$

In expression 1, let the current be constant (di/dt=0), and rearrangement is made with respect to the winding current i of the motor, which becomes as expression 2.

$$P = R\left(i - \frac{K_V \omega}{2R}\right)^2 - \frac{K_V^2 \omega^2}{4R} \qquad (2)$$

As represented by expression 2, the electric power P of the motor is represented by a quadratic function of the winding current i of the motor, which is illustrated by a graph as FIG. 6. In FIG. 6, the horizontal axis represents the winding current i of the motor, and the vertical axis represents the electric power P of the motor. As apparent from FIG. 6, if the winding current i of the motor is less than $K_V\omega/R$, regeneration of the electric power is performed due to deceleration of the motor, whereas if the winding current i of the motor is no less than $K_V\omega/R$, consumption of the electric power is performed due to deceleration of the motor. Because the torque of the motor is proportional to the winding current of the motor, it is apparent from expression 2 and FIG. 6 that depending on specifications of the motor, when the deceleration torque is allowed to be too large in the "deceleration by control", instead of regeneration, a powering operation which consumes the electric power is performed.

In stopping the motor when a power failure occurs as soon as possible, if the deceleration torque is allowed to be too large in the "deceleration by control" so that consumption of electric power is performed, and electric power in the DC link decreases, a device (common power source) which supplies the power source comes to fail to supply electric power, and the low voltage alarm is generated in an amplifier (inverter). When the low voltage alarm is generated, a switch from the "deceleration by control" to the "deceleration by hardware (dynamic brake)" is made. If such a switch is made early, a distance for the motor to stop (braking distance) becomes long.

SUMMARY OF INVENTION

It is an object of the invention to provide a motor control device which can shorten a stopping distance of a motor, while avoiding generation of a low voltage alarm after a power failure of a power source.

In order to achieve the above-described object, a motor control device which controls a motor in a machine tool or an industrial machine includes: a power failure detection unit that detects a power failure of a power source which supplies electric power for driving the motor; a DC link voltage detection unit that detects a value of a DC link voltage applied to an amplifier which drives the motor; a comparison unit which compares the value of the DC link voltage and a predetermined threshold value; a torque command generation unit which generates a torque command for driving the motor; a torque limit value setting unit which sets a torque limit value in accordance with a result of a comparison by the comparison unit; and a torque command limit unit which limits the torque command to the torque limit value when a power failure is detected by the power failure detection unit.

Herein, it is also possible that as a result of the comparison by the comparison unit, the torque limit value setting unit sets a first torque limit value when the value of the DC link voltage is less than the predetermined threshold value, and sets a second torque limit value greater than the first torque limit value when the value of the DC link voltage is no less than the predetermined threshold value.

Further, it is also possible that the above predetermined threshold value is a fixed value which is set in advance.

Moreover, it is also possible that the motor control device further includes a retention unit which retains a value of the DC link voltage detected by the DC link voltage detection unit for each predetermined cycle time, in which the predetermined threshold value is a value of the DC link voltage that has been detected in a cycle time previous to a cycle time, in which the DC link voltage as used for a comparison by the comparison unit is detected, and has been retained by the retention unit.

It is also possible that the motor control device further includes a velocity detection unit which detects an angular velocity of the motor as driven, in which as the first torque limit value when the value of the DC link voltage is less than the predetermined threshold value, a torque limit value setting unit sets such torque limit value that is determined based on the angular velocity detected by the velocity detection unit and allows a decrease of the DC link voltage to be restrained.

Further, assuming that with respect to the motor as driven, a counter electromotive force coefficient is $K_V$, a torque constant is $K_T$, a winding resistance is R, and the angular velocity is $\omega$, the torque limit value setting unit sets the first torque limit value in such a manner as to be a value not greater than $T_{upper}$ which is calculated based on the below expression.

$$T_{upper} = \frac{K_V K_T \omega}{R}$$

Moreover, it is also possible that the torque limit value setting unit sets the second torque limit value when the value of the DC link voltage is no less than the predetermined threshold value in such a manner as to be a value not greater than a maximum torque allowable for the motor as driven.

BRIEF DESCRIPTION OF THE DRAWINGS

The present invention will be understood more clearly by referring to the following accompanying drawings.

DETAILED DESCRIPTION

A motor control device including a torque command limit unit will be described below with reference to the drawings. However, it should to be understood that the present invention is not limited to the drawings or embodiments described below.

Figure 1:
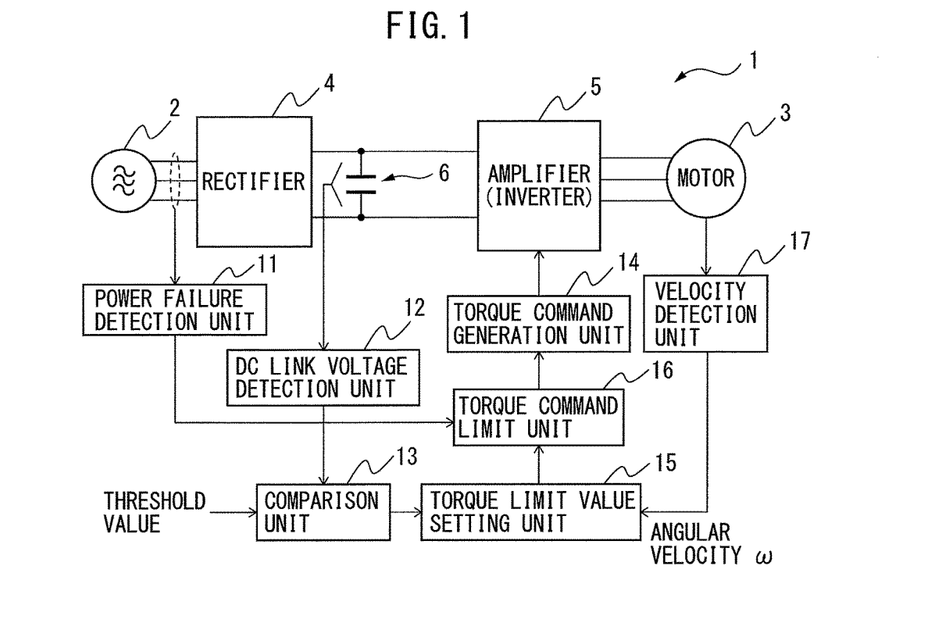
FIG. 1 is a block diagram of a motor control device according to an embodiment.

FIG. 1 is a block diagram of a motor control device according to an embodiment. Hereinafter, it is assumed that the elements denoted by the same reference signs in different drawings mean elements having the same functions.

A motor control device 1 according to the embodiment converts alternating current power supplied from an alternating current power source (hereinafter, occasionally simply referred to as power source) 2 to electric power suitable for driving a motor 3 and supplies the electric power to the motor 3. The motor 3 is used as a drive source for, for example, a feed axis and a main axis of a machine tool, or an arm and the like of an industrial machine and an industrial robot. Note that a type of the motor 3 driven by the motor control device 1 is not to limit the present invention, and may be an alternating current motor, such as an induction motor and a synchronous motor, or a direct current motor. In the present embodiment, by way of example, a case in which the motor 3 is an alternating current motor will be described. Further, in the example as depicted, the number of phases of the alternating current power source 2 is three, but the number of phases is also not to particularly limit the present invention, and in addition to the three phase, for example, a single phase or other polyphase alternating current power source may be configured. Examples of the alternating current power source 2 include a three phase alternating current 400 V power source, a three phase alternating current 200 V power source, a three phase alternating current 600 V power source, a single phase alternating current 100 V power source, and the like.

In the motor control device 1, the alternating current power inputted from an alternating current power source 2 side is converted by a rectifier 4 to direct current power and the direct current power is outputted to a DC link. In the DC link, for the purpose of restraining a pulsating component of a direct current output of the rectifier 4 and accumulating direct current power, a DC link capacitor 6 is provided. A voltage of the DC link (hereinafter, "DC link voltage") is applied to an amplifier 5 which drives the motor 3. The amplifier 5 is configured with an inverter made of a full bridge circuit of semiconductor switching elements, converts the DC link voltage to an alternating current voltage by the switching element being driven and turned on or off in accordance with a switching command generated based on a torque command, and supplies drive power to the motor 3. Further, the amplifier 5 can convert, as described below, alternating current power regenerated in the motor 3 to direct current power and output the direct current power to the DC link. Note that a type and a configuration of the rectifier 4 and the amplifier 5 are not to particularly limit the present invention.

The motor control device 1 according to the present embodiment includes a power failure detection unit 11, a DC link voltage detection unit 12, a comparison unit 13 which compares the DC link voltage with a predetermined threshold value, a torque command generation unit 14, a torque limit value setting unit 15, a torque command limit unit 16, and a velocity detection unit 17.

The power failure detection unit 11 detects a power failure of the alternating current power source 2 which supplies electric power for driving the motor 3. A power failure detection method itself is not to particularly limit the present invention, but, for example, there is a method of coordinate transforming a three phase alternating current input voltage at the alternating current power source 2 side of the rectifier 4 to a voltage vector on two phase coordinates which is equivalent thereto, calculating an amplitude of the vector, thereby calculating an amplitude value of a power source voltage, and detecting a power failure when a state in which the amplitude value falls below a predetermined reference voltage value continues for a predetermined reference time. When the power failure detection unit 11 detects a power failure of the alternating current power source 2, a power failure detection signal indicative of detecting a power failure is transmitted to the torque command limit unit 16.

The DC link voltage detection unit 12 detects a value of the DC link voltage applied to the amplifier 5 which drives the motor 3. The value of the DC link voltage detected by the DC link voltage detection unit 12 is transmitted to the comparison unit 13.

The comparison unit 13 compares the value of the DC link voltage detected by the DC link voltage detection unit 12 with the predetermined threshold value. The threshold value will be later described in detail.

The torque command generation unit 14 generates the torque command for driving the motor 3. The amplifier (inverter) 5 outputs alternating current power to the motor 3 (electric power supply operation) or to which alternating current power is inputted from the motor 3 (electric power regeneration operation) such that the motor 3 can perform a rotation operation using torque in accordance with the torque command. For example, when the amplifier 5 is a PWM control type inverter, the torque command generated by the torque command generation unit 14 is transformed to a PWM control signal for PWM controlling a switching operation of each semiconductor switching element in the amplifier 5 and the PWM control signal is transmitted to each semiconductor switching element in the amplifier 5.

The torque limit value setting unit 15 sets a torque limit value in accordance with a result of comparison by the comparison unit 13. The torque limit value will be later described in detail. The torque limit value set by the torque limit value setting unit 15 is transmitted to the torque command limit unit 16.

The torque command limit unit 16 limits the torque command generated by the torque command generation unit 14 to the torque limit value when a power failure is detected by the power failure detection unit 11. In other words, when a power failure is detected, the torque limit value as the torque command is outputted from the torque command generation unit 14, the torque limit value is transformed to the switching command for controlling the switching operation of each semiconductor switching element in the amplifier 5, the switching command is transmitted to each semi-conductor switching element in the amplifier 5, and based on thereabove, the amplifier 5 performs an electric power conversion operation.

The velocity detection unit 17 detects an angular velocity of the motor 3 as driven. The angular velocity detected by the velocity detection unit 17 is transmitted to the torque limit value setting unit 15.

Next, an operation principle of the motor control device 1 according to the present embodiment will be described.

As described with reference to FIGS. 5 and 6, in deceleration by generating a deceleration torque in the motor 3 ("deceleration by control"), whether the motor 3 regenerates the electric power and whether the motor 3 consumes the electric power are switched in accordance with the magnitude of the deceleration torque. As apparent from FIG. 6, when a winding current i of the motor 3 is less than $K_V\omega/R$, regeneration of electric power is performed if a deceleration torque is generated in the motor 3, and when the winding current i of the motor 3 is no less than $Kv\omega/R$, consumption of electric power is performed if a deceleration torque is generated in the motor 3. Further, with a torque constant $K_T$ [N/Arms], a relational expression as represented by expression 4 holds true between the winding current i of the motor 3 and a torque T.

$$T = K_T i \tag{4}$$

Thus, when the torque T of the motor 3 is less than $K_V K_t \omega/R$, regeneration of electric power is performed if the motor 3 is allowed to generate a deceleration torque, and when the torque T of the motor 3 is no less than $K_V K_t \omega/R$, consumption of electric power is performed if a deceleration torque is generated in the motor 3. If a power failure occurs at the alternating current power source 2 side of the rectifier 4, the direct current power is no more outputted from the rectifier 4, and thus it is preferable to perform the "deceleration by control", which is deceleration by generating a deceleration torque in the motor 3 in the meantime, using electric power as accumulated in the DC link. There is an advantage that the larger the deceleration torque is, the shorter a stopping distance (braking distance) of the motor 3 become, but if the torque T is no less than $K_V K_t \omega/R$, electric power is consumed by the motor 3 regardless of deceleration of the motor 3 so that it is possible that the DC link voltage decreases and a low voltage alarm is generated in the amplifier 5. On the other hand, there is a disadvantage that the smaller the deceleration torque is, the longer the stopping distance (braking distance) of the motor 3 becomes, but if the torque T is less than $K_V K_t \omega/R$, electric power is regenerated from the motor 3 due to deceleration of the motor 3 so that the DC link voltage does not decrease and the low voltage alarm is not generated. Then, in a power failure of the alternating current power source 2, to stop the motor 3 in a time as short as possible while avoiding generation of the low voltage alarm, if the value of the DC link voltage is less than the predetermined threshold value, a first torque limit value $T_{lim1}$ is set, and if the value of the DC link voltage is no less than the predetermined threshold value, a second torque limit value $T_{lim2}$ greater than the first torque limit value $T_{lim1}$ is set. In other words, a relationship of "the first torque limit value $T_{lim1}$<the second torque limit value $T_{lim2}$" holds true. In a power failure of the alternating current power source 2, either one torque limit value of the first torque limit value $T_{lim1}$ or the second torque limit value $T_{lim2}$ is set in accordance with the value of the DC link voltage, and the torque command is limited by the torque limit value, so that it is configured that the stopping distance (braking distance) of the motor 3 becomes as short as possible (in other words, the motor 3 can stop in a time as short as possible) while avoiding the generation of the low voltage alarm. Setting which of the first torque limit value $T_{lim1}$ or the second torque limit value $T_{lim2}$ is performed by the torque limit value setting unit 15. Further, a process of limiting the torque command generated by the torque command generation unit 14 to the torque limit value is performed by the torque command limit unit 16.

As the first torque limit value $T_{lim1}$ when the value of the DC link voltage is less than the predetermined threshold value, the torque limit value which is determined based on the angular velocity detected by the velocity detection unit 17 and allows a decrease of the DC link voltage to be restrained is set. As described above, if the torque T is less than $K_V K_t \omega / R$, electric power is regenerated from the motor 3 due to deceleration of the motor 3, thus if the first torque limit value $T_{lim1}$ is set in such a manner as to be a value not greater than $K_V K_t \omega / R$ ($=T_{upper}$), the DC link voltage fails to decrease even when the torque command is limited to the first torque limit value $T_{lim1}$. In other words, the upper limit value $T_{upper}$ of the first torque limit value $T_{lim1}$ is $K_V K_t \omega / R$.

On the other hand, the second torque limit value $T_{lim2}$ when the value of the DC link voltage is no less than the predetermined threshold value may be set to be a value greater than the first torque limit value $T_{lim1}$ as described above, but an upper limit value thereof is a maximum torque allowable for the motor 3. When the value of the DC link voltage is no less than the predetermined threshold value, electric power as accumulated in the DC link can be considered to be in a comparatively affordable state, and thus the "deceleration by control" which is deceleration by generating a deceleration torque in the motor 3 may be performed within a range not exceeding the maximum torque allowable for the motor 3.

Thus, in a power failure of the alternating current power source 2, to stop the motor 3 in a time as short as possible while avoiding generation of the low voltage alarm, a value of the torque limit value is switched in accordance with the value of the DC link voltage.

Then, the above predetermined threshold value may be set as a fixed value which is set in advance.

Figure 2:
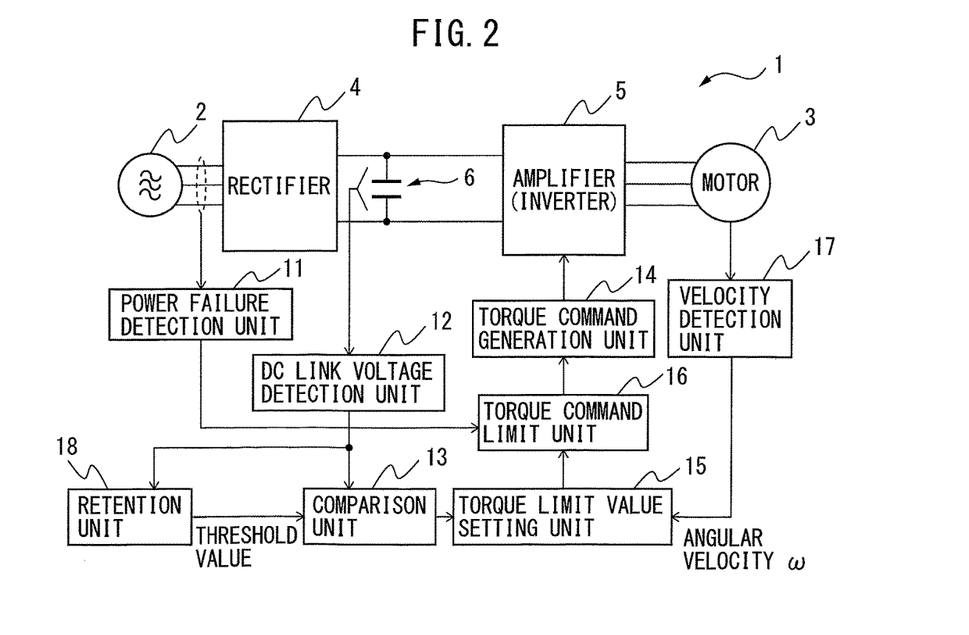
FIG. 2 is a block diagram of the motor control device according to another embodiment.

Alternatively, as the above predetermined threshold value, a value of the DC link voltage detected in a cycle time previous to a cycle time in which the DC link voltage as used for a comparison by the comparison unit 13 is detected may be set. FIG. 2 is a block diagram of the motor control device according to another embodiment. The DC link voltage detection unit 12 detects a value of the DC link voltage over a predetermined cycle time, but by providing a retention unit 18 that once retains the value of the DC link voltage detected by the DC link voltage detection unit 12, the comparison unit 13 can compare the value of the DC link voltage detected by the DC link voltage detection unit 12 with a value of the DC link voltage detected in a cycle time previous to a cycle time in which the DC link voltage is detected (in other words, this is employed as the threshold value). Providing the retention unit 18 enables a determination of whether the DC link voltage has a tendency to increase or decrease in the comparison unit 13. Accordingly, the motor 3 can be stopped in a time as short as possible while avoiding generation of the low voltage alarm in a more reliable manner. For example, when a value of the DC link voltage is less than a value of the DC link voltage detected in a cycle time previous to a cycle time in which the DC link voltage is detected (i.e. value retained by the retention unit 18 as the threshold value), the DC link voltage has a tendency to decrease, and thus the first torque limit value $T_{lim1}$ is set, and when a value of the DC link voltage is no less than a value of the DC link voltage detected in a cycle time previous to a cycle time in which the DC link voltage is detected (i.e. value retained by the retention unit 18 as the threshold value), the DC link voltage has a tendency to increase, and thus the second torque limit value $T_{lim2}$ greater than the first torque limit value $T_{lim1}$ is set.

Figure 3:
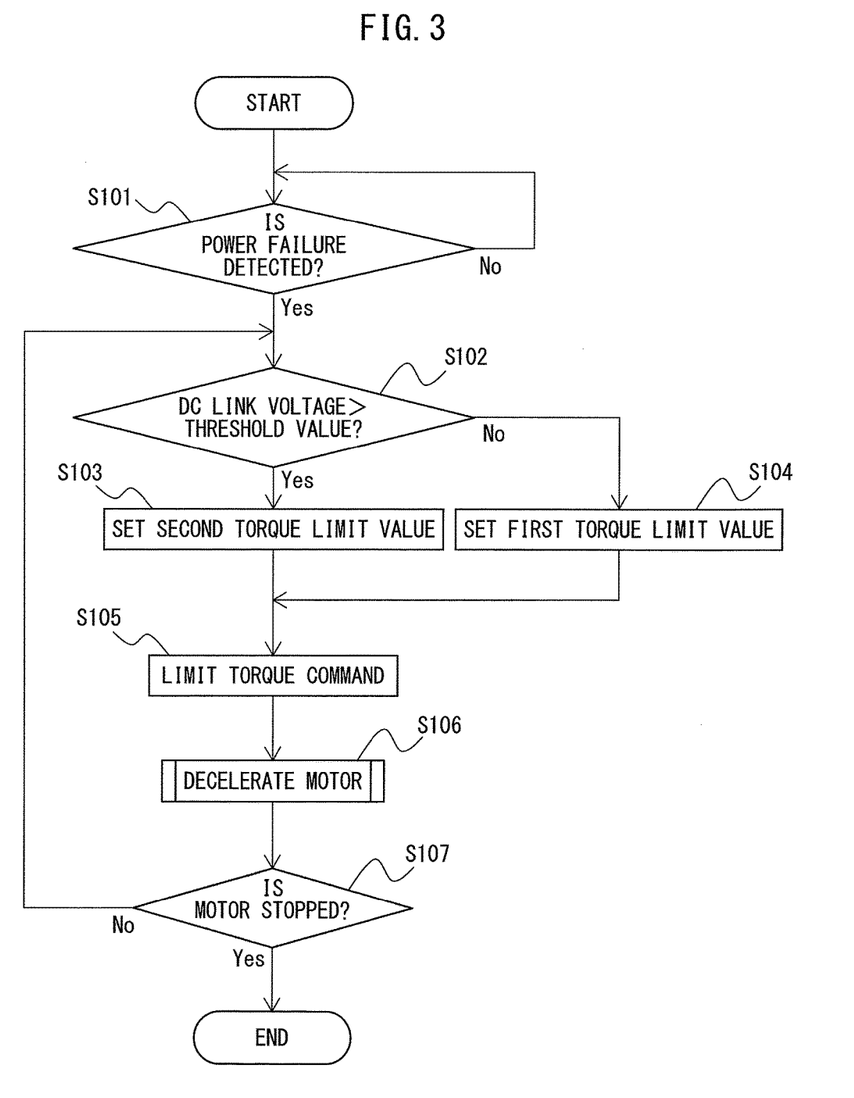
FIG. 3 is a flowchart illustrating an operation flow of the motor control device according to the embodiment.

FIG. 3 is a flowchart illustrating an operation flow of the motor control device according to the embodiment.

When the motor 3 is controlled by the motor control device 1, first, in step S101, the power failure detection unit 11 detects the presence or absence of occurrence of a power failure of the alternating current power source 2. If the power failure detection unit 11 detects a power failure of the alternating current power source 2, the power failure detection signal indicating the detection of the power failure is transmitted to the torque command limit unit 16, and then a process proceeds to step S102.

In step S102, the comparison unit 13 determines whether a value of the DC link voltage detected by the DC link voltage detection unit 12 is no less than the predetermined threshold value. When the value of the DC link voltage is no less than the predetermined threshold value, a process proceeds to step S103, and when the value of the DC link voltage is less than the predetermined threshold value, a process proceeds to step S104.

In step S103, the torque limit value setting unit 15 sets the second torque limit value $T_{lim2}$.

In step S104, the torque limit value setting unit 15 sets the first torque limit value $T_{lim1}$.

In step S105, the torque command limit unit 16 limits a torque command generated by the torque command generation unit 14 to the second torque limit value $T_{lim2}$ as set in step S103 or the first torque limit value $T_{lim1}$ as set in step S104.

The amplifier (inverter) 5 controls a switching operation of each semiconductor switching element in the amplifier 5 in accordance with a switching command created based on the torque limit value as set, and performs such an electric power conversion operation as to generate a deceleration torque in the motor 3. Thereby, the deceleration torque is generated in the motor 3 and deceleration is made (step S106).

In step S107, whether the motor 3 has come to a complete stop is determined. Such a determination may be performed, for example, by the torque command limit unit 16 or a master control means (unillustrated) based on an angular velocity detected by the velocity detection unit 17. When the motor 3 has not come to a complete stop, a process returns to step S102.

After a power failure of the alternating current power source 2 is detected in step S101, processes of steps S102 to S107 are repeatedly performed until in step S107, a determination in which the motor 3 has come to a complete stop is made. In the meantime, in accordance with a value of the DC link voltage, a value is switched to the first torque limit value $T_{lim1}$ or the second torque limit value $T_{lim2}$, and a deceleration torque in accordance with a torque command limited to the torque limit value as set is generated in the motor 3. The present embodiment enables such flexible deceleration that when electric power as accumulated in the DC link is comparatively affordable, quick deceleration is made using the large second torque limit value $T_{lim2}$, and when electric power as accumulated in the DC link is not affordable, such deceleration that a decrease of the DC link voltage is restrained is made using the small first torque limit value $T_{lim1}$ so that the stopping distance (braking distance)

of the motor 3 can be shortened while avoiding the generation of the low voltage alarm in the amplifier 5.

Figure 4:
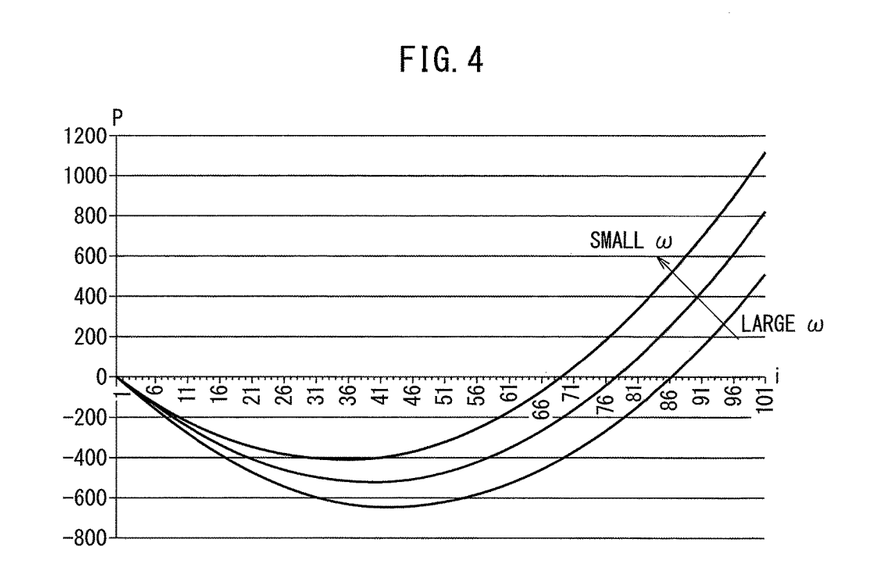
FIG. 4 is a diagram illustrating a relationship between an angular velocity of a motor and electric power regeneration or electric power consumption of the motor.

FIG. 4 is a diagram illustrating a relationship between an angular velocity of the motor and electric power regeneration or electric power consumption of the motor. In FIG. 4, the horizontal axis represents the winding current i of the motor 3, and the vertical axis represents the electric power P of the motor 3. As described with reference to FIGS. 5 and 6, in deceleration by generating a deceleration torque in the motor 3 ("deceleration by control"), whether the motor 3 regenerates the electric power and whether the motor 3 consumes the electric power are switched in accordance with the magnitude of the deceleration torque. When the winding current i of the motor 3 is less than $K_V\omega/R$, regeneration of electric power is performed if the deceleration torque is generated in the motor 3, and when the winding current i of the motor 3 is no less than $K_V\omega/R$, consumption of electric power is performed if the deceleration torque is generated in the motor 3. The lower the angular velocity ω of the motor 3 is, the smaller a value $K_V\omega/R$ of the winding current of the motor 3 which switches from electric power consumption to electric power regeneration becomes. Depending on specifications of the motor 3, there are cases in which for a while after a power failure of the alternating current power source 2 occurs (while the angular velocity ω of the motor 3 is still comparatively high), only electric power regeneration is performed. However, if deceleration of the motor 3 continues and the angular velocity ω of the motor 3 lowers to some extent, the value $K_V\omega/R$ of the winding current of the motor 3 which switches from electric power consumption to electric power regeneration decreases, and thus a state that "electric power is consumed by the motor 3 regardless of deceleration of the motor 3" may occur. Thus, no matter what parameters specifications of the motor 3 are, the motor control device can shorten the stopping distance of the motor 3, while avoiding generation of the low voltage alarm after a power failure of the power source.

Note that the comparison unit 13, the torque command generation unit 14, the torque limit value setting unit 15, and the torque command limit unit 16 as described above for example may be constructed in a software program format, or may be constructed by combination of various kinds of electronic circuits and a software program. For example, when these units are constructed in a software program format, an arithmetic processing device in the motor control device 1 is operated in accordance with the software program, whereby a function of each unit as described above can be realized. Alternatively, the comparison unit 13, the torque command generation unit 14, the torque limit value setting unit 15, and the torque command limit unit 16 may be realized as a semiconductor integrated circuit to which a software program that realizes a function of each unit is written.

According to the present invention, in the motor control device which controls a motor in a machine tool or an industrial machine, the stopping distance of the motor can be shortened while avoiding the generation of a low voltage alarm after a power failure of a power source. The present invention enables such flexible deceleration operation that when electric power as accumulated in the DC link is comparatively affordable, the motor is decelerated using a large torque limit value, and when electric power as accumulated in the DC link is not affordable, the motor is decelerated using a small torque limit value to such an extent that a decrease of the DC link voltage is restrained so that the stopping distance of the motor can be shortened (the motor is stopped in a short time) while avoiding the generation of the low voltage alarm.

What is claimed is:

1. A motor control device which controls a motor in a machine tool or an industrial machine, the motor control device comprising:
   a power outage detection unit that detects a power outage of a power source which supplies electric power for driving the motor;
   a DC link voltage detection unit that detects a value of a DC link voltage applied to an amplifier which drives the motor;
   a comparison unit which compares the value of the DC link voltage with a predetermined threshold value;
   a torque command generation unit which generates a torque command for driving the motor;
   a torque limit value setting unit which sets a torque limit value in accordance with a result of a comparison by the comparison unit; and
   a torque command limit unit which limits the torque command to the torque limit value when a power outage is detected by the power outage detection unit, and
   wherein as a result of the comparison by the comparison unit, the torque limit value setting unit:
      sets a first torque limit value when the value of the DC link voltage is less than the predetermined threshold value, and
      sets a second torque limit value greater than the first torque limit value when the value of the DC link voltage is not less than the predetermined threshold value,
   wherein the first torque limit value and the second torque limit value are set to minimize a stopping distance of the motor while avoiding a reduction of the DC link voltage below a low voltage threshold.

2. The motor control device according to claim 1, wherein the predetermined threshold value is a fixed value which is set in advance.

3. The motor control device according to claim 1, further comprising: a retention unit which retains a value of the DC link voltage detected by the DC link voltage detection unit for each predetermined cycle time, wherein
   the predetermined threshold value is a value of the DC link voltage that has been detected in a cycle time previous to a cycle time, in which the DC link voltage as used for a comparison by the comparison unit is detected, and has been retained by the retention unit.

4. The motor control device according to claim 1, further comprising: a velocity detection unit which detects an angular velocity of the motor as driven, wherein when the value of the DC link voltage is less than the predetermined threshold value, a torque limit value setting unit sets the first torque limit value that is determined based on the angular velocity detected by the velocity detection unit, which allows a decrease of the DC link voltage to be restrained.

5. The motor control device according to claim 4, wherein assuming that a counter electromotive force coefficient of the motor as driven is $K_V$, a torque constant is $K_T$, a winding resistance is R, and the angular velocity is co, the torque limit value setting unit sets the first torque limit value in such a manner as to be a value not greater than $T_{upper}$ which is calculated based on the below expression.

$$T_{upper} = \frac{K_V K_T \omega}{R}$$

6. The motor control device according to claim 1, wherein the torque limit value setting unit sets the second torque limit value when the value of the DC link voltage is no less than the predetermined threshold value in such a manner that the value is not greater than a maximum torque allowable for the motor as driven.

* * * * *

UNITED STATES PATENT AND TRADEMARK OFFICE
CERTIFICATE OF CORRECTION

PATENT NO. : 10,027,272 B2
APPLICATION NO. : 15/443116
DATED : July 17, 2018
INVENTOR(S) : Satoshi Ikai and Yuuki Kumamoto Page 1 of 1

It is certified that error appears in the above-identified patent and that said Letters Patent is hereby corrected as shown below:

In the Claims

Column 10, Line 64, Claim 5, delete "co" and insert -- ω --.

Signed and Sealed this
Fourth Day of September, 2018

Andrei Iancu
*Director of the United States Patent and Trademark Office*